United States Patent
Harrah et al.

[15] 3,698,351
[45] Oct. 17, 1972

[54] VIBRATION DETECTOR

[72] Inventors: Robert S. Harrah, P.O. Box 14410, Houston, Tex. 77021; Manmohan Suigh Kalsi, 8706 Amblewood Drive, Houston, Tex. 77072

[73] Assignee: said Harrah, by said Kalsi

[22] Filed: Oct. 27, 1969

[21] Appl. No.: 869,718

[52] U.S. Cl. ..................116/70, 73/492, 74/89.2
[51] Int. Cl. .............................................G01l 19/12
[58] Field of Search .116/114, 112, 70, 114 AH, 124; 73/492; 74/89.20; 200/61.45, 52, 153

[56] References Cited

UNITED STATES PATENTS

| | | | |
|---|---|---|---|
| 2,764,894 | 10/1956 | Faxen | 74/89.2 |
| 3,452,175 | 6/1969 | Wilkes | 200/153 |
| 3,452,309 | 6/1969 | Wilkes | 200/52 X |
| 3,512,498 | 5/1970 | Luebke | 116/114 |

OTHER PUBLICATIONS

Publication: Rolamite: " A New Mechanical Design Concept"
Research Report S C– RR– 67– 656A, Pages – 116,119, Dec. 1967, D. F. Wilkes, 1322 Sandia Laboratory, Albuquerque, N.M.

*Primary Examiner*—Louis J. Capozi
*Attorney*—Donald Gunn

[57] ABSTRACT

For use in detecting vibrations of rotary equipment or the like, the apparatus incorporating a case enclosing a rolamite structure including a pair of cylindrical rollers and tension band, the band being biased to position the rollers at a range of locations on normal or non-excessive vibrations wherein an increase in vibrations moves the cluster to an alternative position to thereby trigger operation of indicator equipment associated with the vibration detector.

10 Claims, 4 Drawing Figures

PATENTED OCT 17 1972 3,698,351

Robert S. Harrah
Manmohan S. Kalsi
INVENTORS

BY Donald Gunn
ATTORNEY

VIBRATION DETECTOR

SUMMARY OF PROBLEM AND SOLUTION

Rotary equipment is often subject to slow failure during which time the vibrations in the equipment increase steadily. At some juncture, the vibrations are defined as excessive and the apparatus should, by all rights, be shut down for repairs and prevention of damage arising from continued operation of the gear. Vibration detection devices have been known in the past, but have been generally found wanting in that they are quite complex, and expensive to manufacture. It is with these problems in view that the device of the present invention is summarized as providing a rolamite assembly within a suitable case having suitable bias means acting on the rolamite cluster to maintain an equilibrium position during ordinary vibrations, and which forms and indication when the rolamite cluster is substantially translated from its equilibrium position in response to vibrations. In the preferred embodiment, gas under pressure is delivered to the interior of the chamber and is blocked so long as the rolamite cluster is at its equilibrium position. However, on excessive vibrations, movement of the rolamite cluster lifts the tension ban from an exhaust port to thereby bleed the pressure from the chamber and to provide a pneumatic signal to cooperative apparatus of any nature. A reset means is incorporated to return the rolamite cluster to its equilibrium condition for further use of the device.

Many objects and advantages of the present invention will become more readily apparent from a consideration of the included specification and drawings, wherein.

Figure 1:
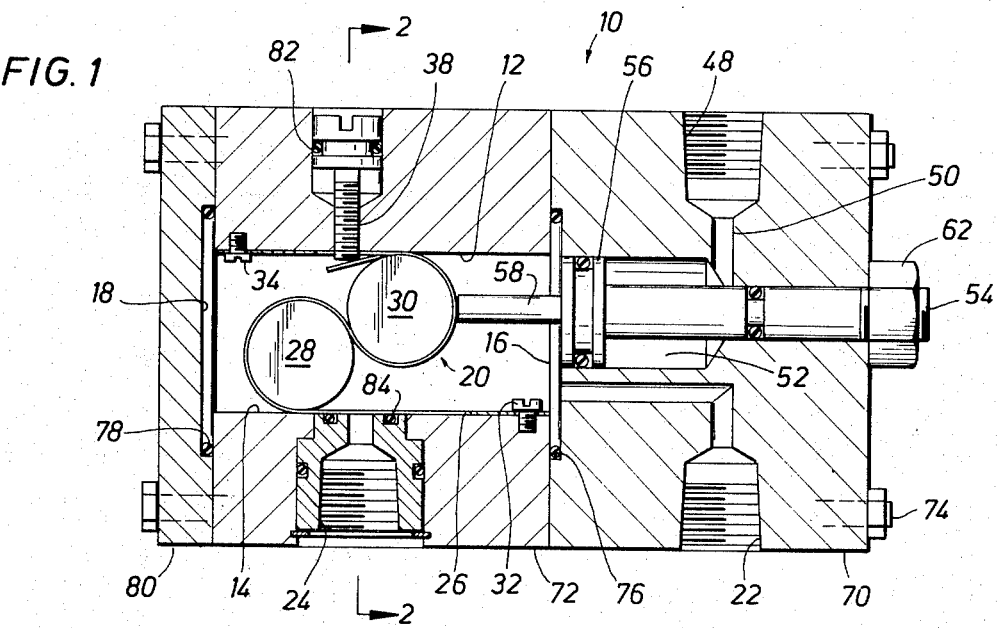
FIG. 1 is a sectional view of the vibration detector of the present invention in its equilibrium condition.

In the drawings, attention is first directed to FIG. 1 which illustrates the vibration detector 10 of the present invention. The vibration detector 10 is formed in a closed housing which includes the upper wall 12, the lower wall 14, the right-hand end 16, and the left-hand portion 18. In cross-section, it will be appreciated that the apparatus is essentially rectangular. Within the case or housing is a rolamite cluster which is indicated generally by the numeral 20. The rolamite apparatus assumes an equilibrium position as shown in FIG. 1 to block the flow of pressure fluid from the inlet at 22 to the outlet at 24. When the vibration becomes excessive, the cluster is accelerated sufficiently to move the cluster to a position on the band at which the band exerts forces of large magnatude to further displace the cluster to the tripped position. In this position, a flow path is established between the outlets 22 and 24 to thereby vent or reduce the pressure within the device 10. Since an opening to atmosphere provides an alarm signal to pneumatically operated equipment that the apparatus should be shut down, through the use of cooperative equipment, such a result in readily achieved. It will be noted from the foregoing that the vibration detector of the present invention provides the alarm signal to the equipment.

Considering the invention more in detail, the upper wall 12 and the lower wall 14 cooperate with the side walls to form a rectangular passage way between the end caps or pieces 16 and 18. The rolamite cluster 20 received within the chamber includes a flexible band 26 which passes about the two rollers 28 and 30 in the manner illustrated. The right-hand end of the band is fixed in position by a single bolt 32 or other suitable means. Likewise, the left-hand end of the flexible band 26 is fixed in position by the similar bolt 34. It will be noted that the left-hand end of the flexible band terminates at the upper side wall 12 whereas the right-hand end of the band, as viewed in the drawings, terminates on the lower wall 14. Consequently, the movement of two rollers captured in loops of the band displaces the band from one wall to the other, which is accomplished through rolling contact and without frictional slippage.

Figure 3:
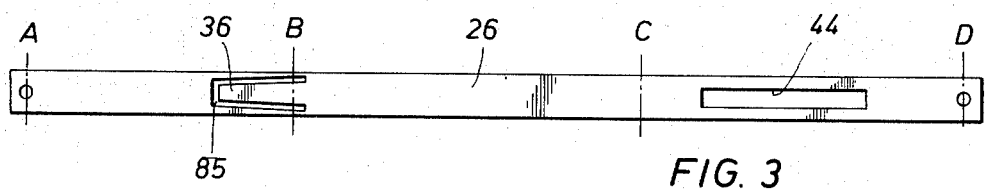
FIG. 3 is a view of the tension band of the present invention; and, FIG. 4 is a force diagram indicating the lateral forces acting on the rolamite cluster.
Figure 2:
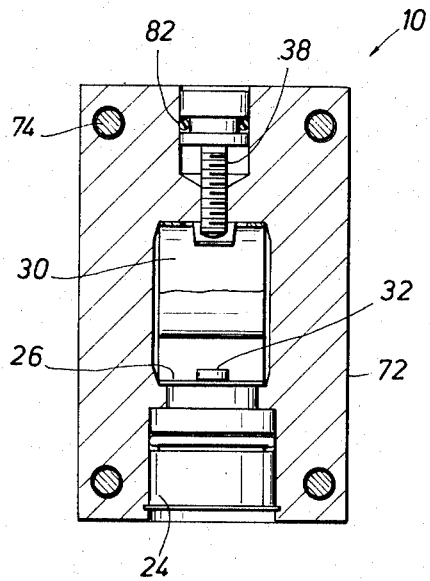
FIG. 2 is a sectional view taken along the line 2—2 of FIG. 1 showing the set screw cooperative with the tension band which adjust the sensitivity of the apparatus
Figure 4:
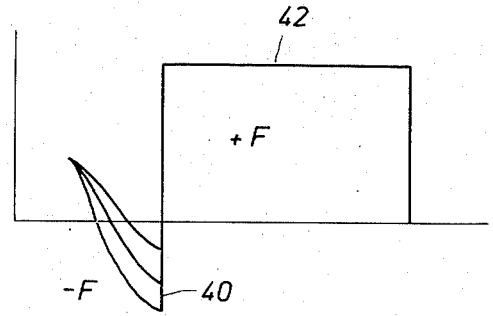

Note should be taken that the rollers 28 and 30 are captured in the loops such that both rollers must roll and not slip. In operation, the rolamite cluster travels to and fro along the length of the band, when unimpeded, wherein the contact between the band and the side walls 12 and 14 is a rolling removal of the band from the side wall. Moreover, as a particular point on the band becomes engaged by first one roller and then the other, the engagement is strictly by rolling contact to thereby eliminate friction in operation of device. The rolamite cluster, including the central portions of the band 26 and the two rollers 28 and 30, is urged to a central, equilibrium condition is achieved illustrated in FIG. 1. The equilibrium conditions is achieved in the following manner. As shown in FIG. 3, the flexible band 26 has a cut-out portion 85 with tab 36. The tab 36 projects over a set screw 38 which protrudes into the chamber and passes through the cutout opening of the flexible ban 26 to slightly bend or deflect the tab 36. As shown in FIG. 1, the rolamite cluster cannot roll to the left over the set screw 38. The set screw displaces the tab 36 which creates the force which acts on the rolamite cluster urging it to the right of FIG. 1. The extent to which the screw protrudes into the chamber determines the magnatude of this force. Thus, if the screw were completely withdrawn, the force displacing the tab and urging the rolamite cluster to the right will be reduced to the minimum. More will be noted concerning the magnatude of this force when FIG. 4 is discussed hereinafter.

The tendency of the band 26 59 straighten out creates forces acting to the left and to the right of the apparatus shown in FIG. 1. However, such forces are unequal because of the action the cut-out 85 which weakens the tendency of that portion of the band to straighten out. The result of the cut-out 85 is to produce an unbalanced force tending to move the cluster to the left. This force is opposed by the adjustable force generated by the tab 36. The rolamite cluster 20 thus seeks an equilibrium as shown in FIG. 1 wherein a minimal force is maintained on the cluster tending to move it to the left. On the other hand, the curvature of the tension band 26 around the roller 30 and the force of the tab 36 provide a force tending to move the cluster to the right, and thus equilibrium is achieved.

As shown in FIG. 3, the tension band 26 is flexed at point B which generates a force tending to move the rolamite cluster to the right. The point C corresponds with the first point of curvature between the roller 28 and the side wall 14 and the flexible band 26 likewise generates a force tending to move the rolamite cluster to the left. The band, so to speak, tends to straighten out, and hence, serves as a spring generating the forces above described. Because of the presence of the cutout 85 the forces generated at point B in the band 26 are less than the forces generated at point C. This tends to urge the rolamite cluster to the left. As shown in the graph of FIG. 4, the positive forces are those forces which tend to move the cluster to the right, and the negative forces tend to move the cluster to the left.

When the screw 38 is withdrawn, the cluster has a tendency to move to the left. When the set screw 38 is extended as shown in FIG. 1, the tab 36 is deflected and additional forces tending to move the cluster to the right are created. This is best shown in FIG. 4 wherein that portion of the curve indicated at 40 is subject to variation over a wide range depending on the amount of extension of the set screw 38. Once the cluster tends to break away from the effect of the set screw 38 and moves somewhat to the right, it travels fully to the right-hand end to engage the reset mechanism because of the reduced forces created by the cut-out 44 shown in FIG. 3. The cut-out 44 is physically located to the right of the port 24. Once the cluster exposes the port 24 to the chamber within the housing, the point of bending between the roller 28 and the side wall 14 coincides with the cut-out strip 44 and the band 26, being weakened at this point, tends to move the entire cluster to the right-hand extremity of movement as viewed in FIG. 1. When the cut-out portion 44 contacts the roller 28, a trip point is defined at which the cluster moves to the right, or the position tripped.

In summation, the foregoing describes how the rolamite cluster 20 is kept in equilibrium near to an unstable position with its sensitivity being adjusted by the position of the set screw 38, and yet how the cluster, when sufficiently vibrated, breaks free of the equilibrium position and moves to the right. This movement will now be related to the vibration indicator of the present invention and the manner in which an alarm is formed will be further described.

The vibration indicator of the present invention is preferably used with a pneumatic system. The port 22 communicates with a suitable source of pressure while the port 24 is a vent port. When the rolamite cluster moves to the right, the port 24 is exposed to atmosphere and pressure drops in the line communicated with the port 22. This drop in pressure provides the necessary pneumatic signal for cooperative apparatus, thereby completing the indication that the vibrations have become excessive for the present apparatus.

The structure of the vibration indicator further includes a reset port 48. The port 48 is connected through a passage 50 in communication with a cylindrical chamber 52. A push rod 54 extends through the chamber 52 and carries a piston 56 which is sealed in the camber 52 by means of a conventional O-ring seal. The piston supports a plunger 58 which protrudes into the chamber and is adapted to contact the rolamite cluster 20 for moving it to the left.

As shown in FIG. 1, the piston is located at its left-hand extremity of movement. This extremity of movement is determined by the position of the lock nut 62 carried on the plunger or push rod 54. The reset mechanism presently being described can be operated in either of two ways. The reset port 48 may be connected with a suitable source of pressure, and on increase of pressure into the chamber 52, the piston 56 is moved to the left and the rod 58 contacts the rolamite cluster and moves it to the left, returning it to the equilibrium position. In the alternative, the exposed push rod 54 and lock nut 62 may be grasped by hand and moved to the left as viewed in the drawings to reset the rolamite cluster. The reset plunger is forced back to the extreme right or withdrawn position as soon as air-supply to port 22 is turned on, thus leaving the cluster at its equilibrium position without the plunger interfering with movement of the cluster.

The indicator 10 is preferably assembled of several pieces, although the form or manner of fabrication and assembly is subject to a wide range of variation. In the preferred embodiment, major blocks are indicated at 70 and 72 and are joined together by a number of stud bolts 74 extending through the two blocks 70 and 72. The internal chamber is sealed against leakage by an encircling O-ring 78 which is clamped in position by the end plate 80 which is abutted against the body member 72. Moreover, the set screw 38 incorporates an O-ring 82 to prevent leakage along the tapped opening for the set screw. The friction of the O-ring keeps the screw 38 from working loose due to vibration. In addition, the exhaust port 24 includes an O-ring at 84 which abuts against the lower or nether side of the flexible band 26 to seal the chamber provided for the rolamite cluster against leakage. Other suitable O-rings are carried on the plunger 54 and the piston 56. By and large, the chamber within the housing 10 is sealed against leakage.

In operation, the device of the present invention is installed with its longitudinal axis (the axis parallel to the plunger 58) parallel to the axis of vibration to be detected. If desired, the device of the present invention may be duplicated along orthogonal axes dependent on the mode of vibration expected for the equipment to be protected. The protective indicating device of the present invention is then connected at the port 22 with a shut-off device or the like which is operated by a loss of pressure. The port 24 provides a pressure vent to atmosphere, and may be equipped with a suitable connective line or may be left open as desired. The reset port 48 is connected with a reset line should this feature be used.

The device of the present invention is then observed during conventional operation of the equipment to be protected. Thus, if a large stationary engine is to be protected by the indicating device 10, the setting of the screw 38 is adjusted until the rolamite cluster assumes the position of FIG. 1. The screw is further extended until the cluster is on the verge of tripping and moving to the right. At this juncture, the screw adjustment is backed off perhaps a fraction of a turn to define a trip level greater than the normal vibrations of the equipment but less than vibrations which would be considered excessive. The device is then left untended and will continue to monitor vibration essentially without failure or fatigue over an extended period of time.

The device of the present invention will tolerate slight oscillation while the rolamite cluster maintains the illustrated position of FIG. 1. Because of the variable lateral force created by the tab 36 as shown in FIG. 3, the oscillations from the equilibrium position will persist but the null point will be that illustrated in FIG. 1. However, when the vibrations become excessive and the rolamite cluster moves too far to the right, the force reduction caused by the cut-out 44 causes the cluster 20 to move to the right.

At this juncture, operation of the device should be noted. A vent to atmosphere through the port 24 drops the pressure in the line connected through the port 22 to form the pneumatic signal. It should be noted that lifting the tension band 26 away from the mouth of the port 24 opens the vent to atmosphere. The tension in the band 26 is such that the port 24 is substantially sealed at signal levels.

The present invention is particularly adapted to be installed in different environments having different magnatudes of vibration. In each location, the screw adjustment 38 is operated to offset the vibrations present and is then backed down to provide a desired margin between the setting of the equipment and the trip level. Thus, the present device may be switched from an installation subject to small vibrations to an installation subject to substantial vibrations. The device is readily installed and calibrated, without the use of precision instruments, in the manner described above.

Many variations may be adapted in the present invention. It may be helpful to obtain an electrical indication of operation. In this case, an electrical contact is recessed in the wall 14. The tension band 26 maintains contact with the electrical contact or terminal when the cluster is in the position shown in FIG. 1. However, movement of the cluster to the right ends the contact of the band 26 against the terminal to initiate a contact closure suitably adapted in forming an electrical signal. This is readily easily obtained by connecting one conductor to either end of the tension band 26 and another conductor to the terminal. In some environments, electrical signals and apparatus are not considered safe, and the device may be installed as a pneumatic indicator as described above.

Many adaptations and variations of the device are readily apparent to one skilled in the art. However, the scope of the present invention is determined by the claims appended hereto.

What is claimed is:

1. An indicating device comprising:
   a. rolamite cluster means including a tension band and a pair of rollers;
   b. a case enclosing said rolamite cluster means, said case having a pair of opposing side walls, the distance therebetween being less than the sum of the diameters of said pair of rollers, and said tension band being looped into a pair of bights to at least partially encircle said rollers in the bights thereof wherein said rolamite cluster means has at least a limited range of movement from a first position to a second and different position;
   c. bias means co-acting with said rolamite cluster means tending to maintain said rolamite cluster means in the first position;
   d. said rolamite cluster means having a mass requiring a force exceeding a predetermined level to move said rolamite cluster means from the first to the second position;
   e. alarm condition indicator means cooperatively arranged with respect to said rolamite cluster means to respond to movement of said rolamite cluster means from the first to the second position;
   f. a piston and cylinder arrangement adapted to communicate with a pressure fluid source; and,
   g. a plunger moved by said piston to contact said rolamite cluster means to urge said rolamite cluster means to the first position from the second position.

2. The invention of claim 1 including a set screw acting against a portion of said tension band to create a variable force acting on said rolamite cluster means.

3. The invention of claim 1, wherein said tension band acts on said rollers with a force tending to maintain said cluster means at the first position, there being a means for adjusting the force in a range of values.

4. The invention of claim 1 wherein said indicator means includes a pressure inlet port in said case opening at a point covered by said tension band when said rolamite cluster means is in the first position but exposed in said case on movement of said rolamite cluster means to the second position.

5. The invention of claim 4 wherein an outlet port is formed in said case and in communication with said inlet port selectly controlled by said tension band.

6. The invention of claim 5 wherein one side wall of said case has an opening means therein and a seal means surrounds said opening means and seals against said tension band, said inlet port being connected thereto.

7. The invention of claim 1 wherein said cylinder is positioned with respect to said case so as to direct said plunger toward said rolamite cluster means.

8. The invention of claim 7 wherein said case is formed of two separable portions, one incorporating said side walls and the other including said cylinder.

9. The invention of claim 8 including a seal means between said two portions for defining a leak-proof connection therebetween.

10. The invention of claim 1 further including a partially cut tab in said tension band and wherein said tab is positioned adjacent one of said side walls, and further including an adjustable protruding set screw extending from said side wall and displacing said tab by a controlled and adjustable amount, said tab deflecting and forming a bias force acting on said rolamite cluster means.

* * * * *